(12) United States Patent
Kanda et al.

(10) Patent No.: US 8,128,147 B1
(45) Date of Patent: Mar. 6, 2012

(54) VEHICLE SEAT

(75) Inventors: Kenji Kanda, Tokyo (JP); Masaaki Honda, Tokyo (JP); Yosuke Karino, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 12/975,220

(22) Filed: Dec. 21, 2010

(51) Int. Cl.
*B60N 2/62* (2006.01)

(52) U.S. Cl. ................. 296/65.05; 297/313; 297/321

(58) Field of Classification Search ............ 296/65.05, 296/65.09; 297/312, 313, 321
See application file for complete search history.

(56) References Cited

U.S. PATENT DOCUMENTS

| | | | |
|---|---|---|---|
| 4,583,781 A * | 4/1986 | Hatsutta et al. | 297/284.11 |
| 4,636,002 A * | 1/1987 | Genjiro | 297/319 |
| 4,753,479 A * | 6/1988 | Hatsutta et al. | 297/284.11 |
| 6,435,610 B2 * | 8/2002 | Kondo et al. | 297/284.11 |
| 6,811,219 B2 * | 11/2004 | Hudswell et al. | 297/312 |
| 7,654,615 B2 * | 2/2010 | Ventura et al. | 297/344.15 |

FOREIGN PATENT DOCUMENTS

JP 2008105542 A 5/2008

* cited by examiner

*Primary Examiner* — Dennis Pedder
(74) *Attorney, Agent, or Firm* — Browdy and Neimark, PLLC

(57) ABSTRACT

Vehicle seat including a link for raising and lowering the seat and a tilt pan disposed forwardly of seat cushion frame of the seat. Rotatably provided to the seat cushion frame is an actuator link having: one end portion pivoted to the tilt pan; and another end portion formed with sector gear portion and arcuate hole. A pin for supporting a gear case having a pinion meshed with the sector gear portion is fixed to the seat cushion frame. Such pin is used with both of the link and actuator link, in common. Namely, an upper end portion of the link and the afore-said another end portion of actuator link are collectively disposed at that pin so as to overlap each other, and the upper end portion of link is pivotally connected to the pin, whereas the pin passes through the arcuate hole of actuator link.

4 Claims, 2 Drawing Sheets

VEHICLE SEAT

BACKGROUND OF THE INVENTION

1. Field of the Invention

The present invention relates to a vehicle seat, and in particular relates to a vehicle seat of the type provided with: a seat lifter mechanism (i.e. a seat height mechanism) for effecting adjustment in height of the seat; and a tilt mechanism for causing a forward end portion of seat cushion of the seat to tilt or incline adjustably in a vertical direction.

2. Description of Prior Art

Among various vehicle seats, known is a vehicle seat so designed to enable a user to adjustingly raise and lower the seat by operation of a seat lifter mechanism provided in the seat, and also enable the user to adjustingly tilt or incline a forward end portion of seat cushion of the seat vertically by operation of a tilt mechanism provided in the seat.

For example, the Japanese Laid-Open Patent Publication No. 2008-105542 (or JP 2008-1005542 A1) teaches this kind of seat. According thereto, the seat is equipped with a seat lifter mechanism by which a seat cushion of the seat may be raised and lowered, with the seat cushion itself being maintained in a substantially horizontal state. Also, the seat is equipped with a tilt mechanism by which a forward portion of the seat cushion may be tilted vertically, wherein such forward portion of seat cushion is provided with a tiltable frame or the so-called "tilt pan" therein.

The tilt mechanism comprises: a link member having a forward end pivotally connected to a forward portion of the afore-said tilt pan; a lead screw; a nut member threadedly engaged with the lead screw; and an electric motor operatively connected with the nut member. The link member is at the rearward end thereof pivotally connected to a forward end of the lead screw. Operation of the motor causes rotation of the nut member which in turn causes translation of the lead screw, and the link member connected between the lead screw and tilt pan is thereby moved, so that the tilt pan may be adjustingly tilted or inclined in the vertical direction.

The seat lifter mechanism comprises; four links pivotally connected between the seat cushion and a floor side; a lead screw operatively connected with the rearward end portion of one of the four links; a nut member threadedly engaged with the lead screw; and an electric motor operatively connected with the nut member. Upon operation of the motor, the nut member is rotated to cause translation of the lead screw connected with one of the four links, thereby causing all the four links to move vertically, so that the seat cushion may be adjustingly raised and lowered.

However, the above-described seat has been with the problem that the seat lifter mechanism and tilt mechanism are provided independently of each other, as a result of which, it is necessary to arrange spaces for accommodating each of the two mechanism in the seat cushion, and further, for that purpose, additional parts and elements are required. Thus, with this prior art, it is difficult to reduce spaces for those two mechanisms to widen a space in the seat cushion, and the seat cushion can not be assembled rapidly and economically with a small number of parts.

SUMMARY OF THE INVENTION

In view of the above-stated drawbacks, it is a primary purpose of the present invention to provide an improved vehicle seat of the above-described type having a seat lifter mechanism and a tilt mechanism, which permits for reduction of parts associated with the seat lifter mechanism and tilt mechanism and also widening an space within the seat cushion of the seat.

In order to achieve such purpose, a vehicle seat in accordance with the present invention is basically comprised of;
- a seat cushion frame having a forward end portion facing forwardly of the vehicle seat;
- a tiltable frame pivotally connected with the forward end portion of the seat cushion frame, the tiltable frame being so arranged as to overlie the forward end portion in an overhanging manner and be inclinable vertically relative to the seat cushion frame;
- a link element having: an upper end portion; and a lower end portion pivotally connected with the floor of vehicle;
- a shaft element rotatably provided to the seat cushion frame;
- a substantially sector-shaped link element connected with the shaft element, the substantially sector-shaped link element including: a first end portion pivotally connected with the tiltable frame; and a second end portion having: a sector gear portion formed therewith; and an arcuate hole formed therein so as to extend along a circumference of a circle having a center at a central axis of the shaft element;
- a motor provided with a gear case in an integral manner, the gear case having a pinion being in a meshed engagement with the sector gear portion; and
- a pin with which the gear case is supportively connected, the pin being fixedly attached to the seat cushion frame so as to project horizontally therefrom, wherein the upper end portion of the link element and the second end portion of the substantially sector-shaped link element are collectively disposed at the pin so as to overlap each other, wherein the upper end portion of the link element is pivotally connected with the pin, and wherein the pin passes through the arcuate hole formed in the second end portion of the substantially sector-shaped link element.

As one aspect of the present invention, the seat cushion frame may be formed to have a first lateral frame member having a forward end portion; and a second lateral frame member having a forward end portion. In that mode, the tiltable frame may be pivotally connected between the forward end portion of first lateral frame member and the forward end portion of second lateral frame member, with such an arrangement that the tiltable frame overlies the forward end portions respectively of the first and second lateral frame members in an overhanging manner and be inclinable vertically relative to the seat cushion frame. The shaft element is therefore formed to have: one end rotatably connected with the forward end portion of the first lateral frame member; and another end rotatably connected with the forward end portion of the second lateral frame member. Further, the pin may be fixed to the first lateral frame member so as to project horizontally therefrom, with the upper end portion of the link element being pivotally connected with that pin, while the pin passes through the arcuate hole of the substantially sector-shaped link element.

Other various features and advantages will become apparent from reading of the description, hereinafter, with reference to the accompanied drawings.

DETAILED DESCRIPTION OF PREFERRED

Embodiment of the Invention

Referring to FIGS. 1 to 4, there is illustrated a preferred embodiment of vehicle seat generally designated by (S) in accordance with the present invention, which is provided with a seat lifter mechanism (LM) for adjustment in height of the seat and a tilt mechanism (TM) for causing a tiltable frame (2) of pan-type or the so-called "tilt pan" to be adjustably inclined vertically at the forward end portion of seat cushion of the seat (S). Hereinafter, such tiltable frame (2) shall be referred to as "tilt pan".

The seat (S) is basically comprised of a seat cushion frame (CF) and a seat back frame (BF) rotatably connected with the seat cushion frame (CF). Though not shown, it is to be understood that the seat cushion frame (CF) and seat back frame (BF) are each properly upholstered, using a foam padding and a trim cover assembly covering that foam padding, so that the seat cushion frame (CF) is normally upholstered to form a seat cushion, whereas the seat back frame (BF) is normally upholstered to form a seat back, in the present seat (S).

It is to be noted that the wording "forward" or "forwardly" refers to a forward side (F) facing forwardly of the seat (S), whereas the wording "rearward" or "rearwardly" refers to a rearward side (B) facing rearwardly of the seat (S).

The seat back frame (BF) is shown to include a pair of lateral frame members (15) and (15). On the other hand, the seat cushion frame (CF) is shown as including: a pair of left-side and right-side lateral frame members (3A) and (3B). In brief, the two lateral frame members (15) of seat back frame (BF) are at the respective two lower end portions thereof rotatably connected with respective two rearward end portions of the two lateral frame members (3A) (3B) of seat cushion frame, thereby allowing the seat back frame (BF) to be inclined forwardly and rearwardly relative to the seat back frame (CF), as known in the art.

Figure 1:
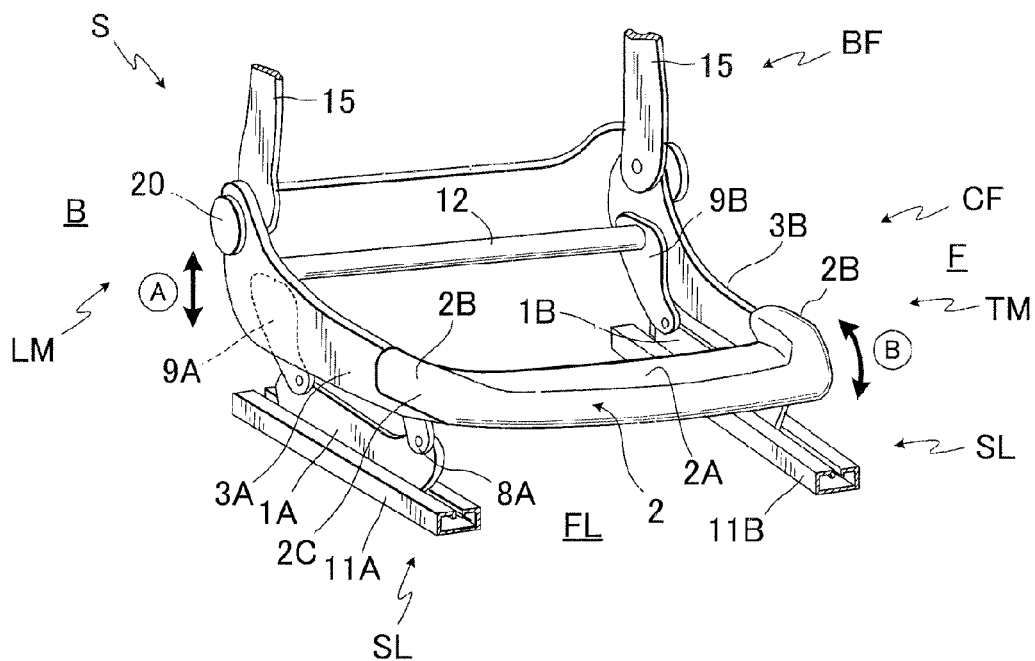
FIG. 1 is a partly broken perspective view showing a vehicle seat in accordance with the present invention.
Figure 2:
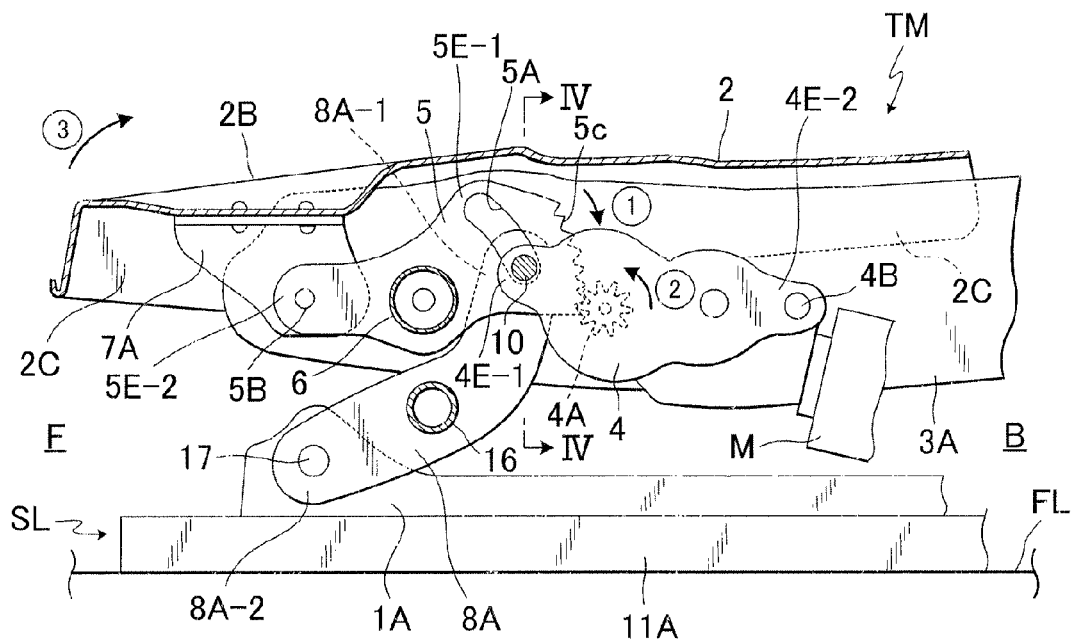
FIG. 2 is a partly broken side view fragmentary in section showing a left-side forward end portion of seat cushion frame and a tilt pan, which are associated with the vehicle seat.
Figure 3:
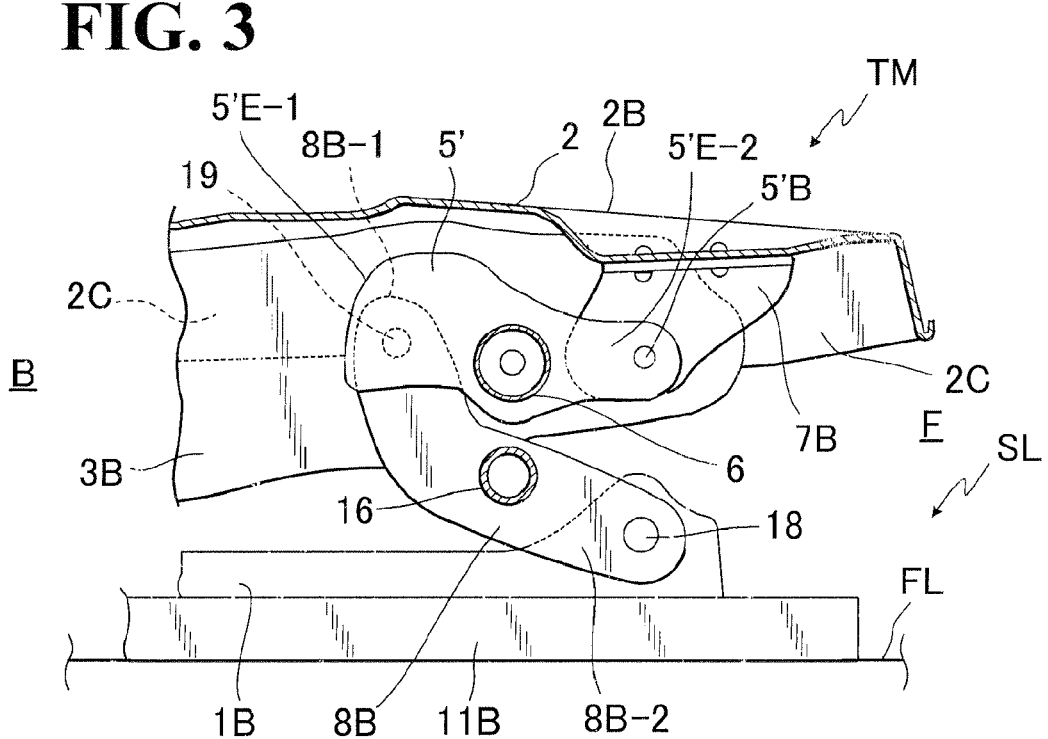
FIG. 3 is a partly broken side view fragmentary in section showing a right-side forward end portion of the seat cushion frame and the tilt pan, which are associated with the vehicle seat.

As seen in FIGS. 1, 2 and 3, the seat lifter mechanism (LM) provided in the seat (S) includes: a left-side first front link (8A); a right-side second front link (8B); a left-side first rear link (9A); and a right-side second rear link (9B). Basically, those front and rear links (8A, 8B, 9A and 9B) are arranged between the seat cushion (at CF) and seat slide device (SL) (or a floor of vehicle designated by FL) in a parallel linkage fashion, as found in the art, such that the two front links (8A) (8B) are maintained in a parallel relation with the respective two rear links (9B) (9B), whenever those all four links are pivotally articulated vertically in synchronized way. With such parallel linkage arrangement, operation of the seat lifter mechanism (LM) causes the seat cushion to move vertically, with a whole body thereof being maintained in a substantially horizontal state with respect to the slide rail device (SL) or floor (FL).

As seen in FIG. 1, the left-side first rear link (9A) is at the upper end thereof pivotally connected with the rearwardly facing portion of the left-side lateral frame member (3A), whereas the right-side second rear link (9B) is at the upper end thereof pivotally connected with the forwardly facing portion of the right-side lateral frame member (3B). A connecting rod (12) is extended between the first and second rear links (9A) (9B), such that one end of the connecting rod (12) is fixed to an upper end of the first rear link (9A), while the other end thereof is fixed to an upper end of the second rear link (9B), so that both first and second rear links (9A) (9B) are rotatively displaced synchronously relative to the respective two lower pivot points at the left- and right-side upper rails, as known in the art.

Designation (20) denotes a handle associated with the seat lifter mechanism (LM) While not shown, the handle (20) is operatively connected with the first rear link (9A) via known appropriate gears or transmission elements, so that, in brief, by operating the handle (20), all the front and rear links (8A, 8B, 9A and 9B) are rotatively displaced at the same time in vertical direction, to thereby cause the seat (S) to raise and lower as indicated by the arrow (A). in FIG. 1.

In this context, the seat slide device (SL) is used with the seat (S) to allow for adjustment in position of the seat (S) in forward and rearward directions. But, the seat slide device (SL) itself may not be used, in which case, all lower end portions of the front and rear links (8A, 8B, 9A and 9B) may be directly or indirectly connected to the floor (FL) in an appropriate manner, using a suitable means. As shown, the seat slide device (SL) typically comprises a pair of left-side upper and lower rails (1A) and (11A) and a pair of right-side upper and lower rails (1B) and (11B). The two upper rails (1A) (11A) are slidably engaged with the respective two lower rails (1B) (11B) fixed on the floor (FL), so that the seat (S) on the upper rails (1A, 11A) is movable along the lower rails (1B, 11B) in the forward and rearward directions.

As known in the art, in general, the tilt pan (at 2) is so configured to overlie the upper wall of the forward end portion of seat cushion frame and overhang the forward vertical wall area and two vertical side wall areas of that particular forward end portion. The illustrated tilt pan (2) is disposed forwardly of the left- and right-side lateral frame members (3A) (3B) in such a manner as to extend between and overlie the two forward end portions respectively of those two lateral frame members (3A) (3B), while overhanging both two vertical walls respectively of those particular two forward end portions, as can be seen from FIGS. 1 to 4. This tilt pan (2), adapted for supportively receiving thigh portions of a seat occupant on the seat (S), is disposed forwardly of the seat cushion frame (CF) and tiltable or inclinable vertically relative to the seat cushion frame or seat cushion (at CF). Of course, though not shown, it is to be understood that the tilt pan (2) is covered with the same upholstery that covers the seat cushion frame (CF), thus defining a forward tiltable region in the forward end portion of seat cushion. Hence, with the above-stated construction of tilt pan (2), it is to be also understood that the forward tiltable region of seat cushion, in which the tilt pan (2) exists, may be inclined vertically as indicated by the arrow (B) in FIG. 1 through operation of the tilt mechanism (TM) that will be described later. The seat occupant therefore can operate the tilt mechanism (TM) to adjustingly raise or lower his or her thigh portions to a desired level, with respect to the rearward stationary main portion of seat cushion upon which a buttocks portion of the seat occupant is rested.

Figure 4:
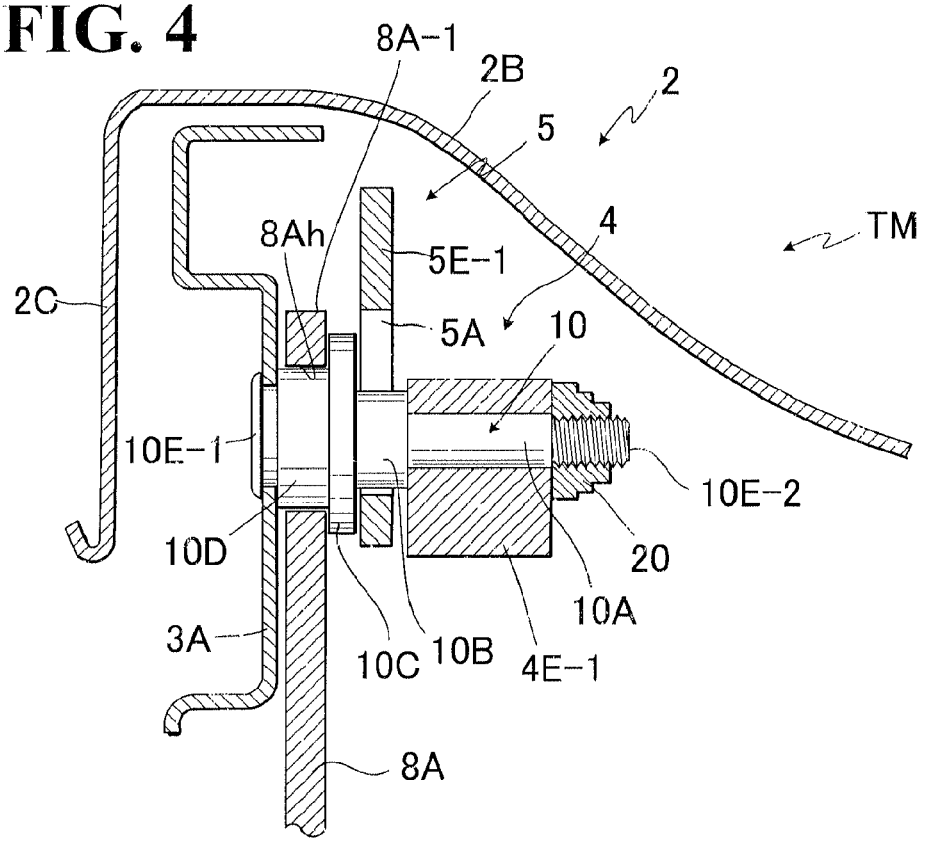
FIG. 4 is a sectional view taken along the line IV-IV in the FIG. 2.

The tilt pan (2) itself is formed from a metallic plate material into the illustrated configuration which has, defined therein, a substantially flat region (2A), a pair of raised lateral bolster regions (2B) and (2B), and a pair of left- and right-side vertical lateral wall regions (2C) and (2C) extending vertically and continuously from the two lateral bolster areas (2B), respectively, as can be seen from FIGS. 2 to 4.

As understandable from FIGS. 2 and 3, a pair of left- and right-side connecting brackets (7A) and (7B) are fixedly attached to the reverse surface of forward end portion of the flat region (2A) of tilt pan (2) so as to be suspended therefrom and also situated near to the left- and right-side vertical lateral wall regions (2C) and (2C) of tilt pan (2), respectively.

The illustrated tilt mechanism (TM) is of a powered type having an electric motor as a drive source, which can be actuated and controlled by operation of a switch (not shown) provided on the seat (S). Basically, the tilt mechanism (TM) is comprised of: a first actuator link (5) having a sector gear portion (5c) formed integrally therewith; a second actuator link (5'); a pinion (4A) meshed with the sector gear portion (5c); and an electric motor (M) provided with a gear case (4) (or reduction gear unit) in an integral manner.

As best seen in FIG. 2, the first actuator link (5) is disposed inwardly of the tilt pan (2) and the forward end portion of the left-side lateral frame member (3A), and so formed to constitute the so-called "sector link" having a sector gear portion (5c) integral therewith. Thus, the first actuator link (5) has a rearward widened end portion (5E-1) of substantially sector shape which becomes divergent rearwardly from the central portion of that link (5) On the other hand, the forward end portion (5E-2) of the first actuator link (5) is pivotally connected by a pin (5B) with the left-side connecting bracket (7A).

Designation (6) denotes a connecting shaft. Although not clearly shown, it is to be understood from FIGS. 2 and 3 that the connecting shaft (6) is extended between the two forward end portions respectively of the left- and right-side lateral frame members (3A)(3B) and rotatably connected therewith, and that further, the two distal end portions of the connecting shaft (5) extend through the respective two frame members (3A)(3B) and are rotatably attached to the left- and right-side vertical lateral wall regions (2C) and (2C) of the tilt pan (2), respectively. Thus, the tilt pan (2) is free to rotate about the connecting rod (5), and therefore the central axis of the connecting shaft (5) is also the center of rotation of that tilt pan (2).

On the understanding thereof, referring to FIG. 2, it is to be seen that the left-side end portion of the connecting shaft (6) penetrates through the central portion of the first actuator link (5) and, otherwise stated, such central portion of first link (5) has a hole fixed on and about that left-side end portion of connecting shaft (6), though not shown. Thus, the first actuator link (5) is at the central portion thereof fixed to the connecting shaft (5), so that, with rotation of that connecting shaft (6), the first actuator link (5) is simultaneously rotated about the central axis of that connecting shaft (6) which is therefore a center of rotation of the first actuator link (5).

Defined integrally in the previously stated rearward widened end portion (5E-1) of first actuator link (5) are an arcuate hole (5A) and the sector gear portion (5c). As shown, the sector gear portion (5c) is formed integrally in the arcuate periphery of the rearward widened end portion (5E-1) so as to extend along the circumference of a circle, the center of which is at the central axis of connecting shaft (6). The arcuate hole (5A) is shown as being situated between the sector gear portion (5c) and the connecting shaft (6). This arcuate hole (5A) also extends along the circumference of a circle having its center at the central axis of connecting shaft (6).

As shown in FIG. 2, the electric motor (M) is disposed inwardly of and near to the forward end portion of the left-side lateral frame member (3A), and the gear case (4) attached integrally to that motor (M) has a pinion (4A) meshed with the afore-said sector gear portion (5c) of first actuator link (5).

Designation (4B) denotes a second pin for supporting the rearward end portion (4E-2) of the gear case (4). Though not shown, the second pin (4B) is at the base end thereof fixedly attached on the inward surface of the forward end portion of left-side lateral frame member (3A) so as to project inwardly of the seat cushion frame (CF). Thus, it s to be understood that the rearward end portion (4E-2) of gear case (4) is fixedly attached by the second pin (4B) to the inward surface of forward end portion of the left-side lateral frame member (3A).

Designation (10) denotes a first pin which is originally designed to support a forward end portion (4E-1) of the gear case (4), but made adaptable for use with other end portions of the constituent elements in common, as will be specified later. In brief, in accordance with the present invention, such first pin (10) associated with the gear case (4) serves as an element for common use with the following two end portions: the left-side first link's rearward end portion (5E-1) and left-side front link's upper end portion (8A-1). Namely, as seen in FIG. 2, the first pin (10) is situated at a point where all the aforesaid two end portions (5E-1) and (8A-1) are collectively disposed so as to overlap each other, whereupon, in addition to the gear case's forward end portion (4E-1) being supported by the first pin (10), the upper end portion (8A-1) of front link (8A) is rotatably supported on and about the first pin (10), while the first pin (10) is also slidably engaged in the arcuate hole (5A) formed in the rearward widened end portion (5E-1) of first actuator link (5).

More specifically, as best shown in FIG. 4, the first pin (10) per se is so formed to have, defined integrally in the columnar body thereof, the following localized regions; a first pin region (10A) about which the forward end portion (4E-1) of gear case (4) is attached; a second pin region (10B) larger in diameter than the first pin region (10A), the second pin region (10B) passing through the arcuate hole (5A); a spacer flange region (100) interposed between the first actuator link's rearward end portion (5E-1) and the first front link's upper end portion (8E-1), the spacer flange region (10C) being largest in diameter; a third pin region (10D) passing through a hole (8Ah) formed in the first front link's upper end portion (8A-1); a base end region (10E-1) firmly attached to the left-side lateral frame member (3A); and a threaded end region (10E-2) with which a securing nut (20) is threadedly engaged.

Accordingly, the first pin (10) is at the base end region (10E-1) thereof fixedly attached on that inward surface of the forward end portion of left-side lateral frame member (3A) so as to project inwardly of the seat cushion frame (CF), and all the three end portions (5E-1), (8A-1) and (4E-1) mentioned above are retained between the first pin's base end region (10E-1) and securing nut (20) against lateral dislocation.

In this respect, it is to be seen that (i) the gear case's forward end portion (4E-1) is retained between the securing nut (20) and second pin region (10B), (ii) the first actuator link's rearward end portion (5E-1) is rotatably retained between the gear case's forward end portion (4E-1) and the spacer flange region (10C), and (iii) the first front link's upper end portion (8A-1) is rotatably retained between the spacer flange region (10C) and inward surface of the left-side lateral frame member (3A).

FIG. 3 illustrates the right-side lateral structure of the tilt mechanism (TM) as well as of the tilt pan (2). The second actuator link (5') is substantially identical in shape to the aforementioned first link (5), except that no sector gear portion is defined in that second actuator link (5'). As shown, the forward end portion (5'E-2) of the second actuator link (5') is pivotally connected by a pin (5'B) with the right-side connecting bracket (7B), and the central portion of the second actuator link (5') is fixed on an about the right-side end portion of the connecting shaft (6) which is in turn rotatably attached to the inward surface of the forward end portion of the right-side lateral frame member (3B) In this connection, it is to be understood that the connecting shaft (6) is horizontally extended between the left-side an right-side lateral frame members (3A) (3B). Since the connecting shaft (6) is at the left-side end portion thereof rotatably attached to the forward end portion of the left-side lateral frame member (3A) as previously stated, rotation of the connecting shaft (5) causes both first and second actuator links (5) (5') to rotate in synchronized way.

The right-side second front link (8B) is shown as being at the upper end portion (8B-1) thereof pivotally connected by a pin (19) with the inward surface of the forward end portion of the right-side lateral frame member (3B), while being at the lower end portion (8B-2) thereof pivotally connected by a pin (18) with the upper rail (1B). It is seen that the rearward widened end portion (5'E-1) of the second actuator link (5') is disposed adjacent to the upper end portion (8B-1) of the second front link (8B), such that those two end portions (5'E-1) (8B-1) overlap each other.

As constructed above, referring to FIG. 2, upon normal operation of the motor (M) for example, the pinion (4A) is rotated anticlockwise as indicated by the arrow (2) to thereby cause simultaneous clockwise rotation of the sector gear portion (5c) of first actuator link (5) relative to the connecting shaft (6), as indicated by the arrow (1). Simultaneous therewith, the forward end portion (5E-2) of the actuator link (5) is rotated clockwise or upwardly, so that the tilt pan (2) is inclined upwardly as indicated by the arrow (3) relative to the connecting shaft (6). In this connection, with vertical rotation of the rearward widened end portion (5E-1) of the actuator link (5), either of the upper and lower edges of the arcuate hole (5A) formed therein is brought to contact with the first pin (10), thereby preventing unrequited excessive rotation of the first actuator link (5). Namely, the first pin (10) serves as a stopper to limit the vertical rotation of that actuator link (5).

From the descriptions above, in accordance with the present invention, it is to be appreciated that one first pin (10), originally designed to support the reduction gear box's forward end portion (4E-1), is made adaptable for use in common with the other two end portions (5E-1) and (8A-1) stated above, and thus the first pin (10) constitutes a common support point by which all other two end portions (5E-1) and (8A-1) stated above are commonly and collectively supported at substantially one and the same location. Also, it is to be appreciated that those two end portions (5E-1) and (8A-1) are so arranged on that first pin (10) as to not only overlap each another, but also be disposed independently of each another, and further the pin (10) serves as a pivot point for the upper end portion of the first front link (8A) in addition to a support point for the gear case's forward end portion (4E-1). With such arrangement, no other connecting element than the first pin (10) is required, and such single first pin (10) suffices for collectively arranging all the three end portions (4E-1, 5E-1 and 8A-1) at one point. Therefore, the number of required parts and elements is greatly reduced, thereby simplifying the structures of the tilt mechanism (TM), seat lifter mechanisms (LM) and seat cushion frame (CF). Moreover, all the three end portions (4E-1), (5E-1) and (8A-1) mentioned above are disposed adjacent to the left-side frame member (3A), hence widening the inward space of the seat cushion frame (CF).

While having described the present invention thus far, it is to be understood that the invention is not limited to the illustrated embodiment, but any modification, addition and replacement may be applied thereto, without departing from the scopes of the appended claims.

What is claimed is:

1. A vehicle seat in combination with a floor of vehicle, comprising:
   a seat cushion frame having a forward end portion facing forwardly of the vehicle seat;
   a tiltable frame pivotally connected with said forward end portion of the seat cushion frame, said tiltable frame being so arranged as to overlie said forward end portion in an overhanging manner and be inclinable vertically relative to said seat cushion frame;
   a link element having: an upper end portion; and a lower end portion pivotally connected with said floor of vehicle;
   a shaft element rotatably provided to said seat cushion frame;
   a substantially sector-shaped link element connected with said shaft element, said substantially sector-shaped link element including: a first end portion pivotally connected with said tiltable frame; and a second end portion having: a sector gear portion formed therewith; and an arcuate hole formed therein so as to extend along a circumference of a circle having a center at a central axis of said shaft element;
   a motor provided with a gear case in an integral manner, said gear case having a pinion being in a meshed engagement with said sector gear portion; and
   a pin with which said gear case is supportively connected, said pin being fixedly attached to said seat cushion frame so as to project horizontally therefrom,
   wherein said upper end portion of said link element and said second end portion of said substantially sector-shaped link element are collectively disposed at said pin so as to overlap each other, wherein said upper end portion of the link element is pivotally connected with said pin, and wherein said pin passes through said arcuate hole formed in said second end portion of the substantially sector-shaped link element.

2. The vehicle seat as claimed in claim 1, which includes a slide rail device comprising a lower rail element fixed on said floor of vehicle and an upper rail element slidably engaged with said lower rail element, wherein said lower end portion of said link element is pivotally connected with said upper rail element.

3. The vehicle seat as claimed in claim 1, wherein said seat cushion frame includes: a first lateral frame member having a forward end portion facing forwardly of the vehicle seat; and a second lateral frame member having a forward end portion facing forwardly of the vehicle seat, wherein said forward end portions respectively of said first and second lateral frame members correspond to said forward end portion of said seat cushion frame, wherein said tiltable frame is pivotally connected between said forward end portion of said first lateral frame member and said forward end portion of said second lateral frame member, wherein said tiltable frame is so arranged as to overlie said forward end portions respectively of said first and second lateral frame members in an overhanging manner and be inclinable vertically relative to said seat cushion frame, wherein said shaft element has: one end rotatably connected with said forward end portion of said first lateral frame member; and another end rotatably connected with said forward end portion of said second lateral frame member, wherein said pin is fixed to said first lateral frame member so as to project horizontally therefrom.

4. The vehicle seat as claimed in claim 1, wherein said pin is so formed to have a first pin region with which said gear case is supportively connected; a second pin region larger in diameter than said first pin region, said second pin region passing through said arcuate hole; a third pin region with which said upper end portion of said link element is pivotally connected; a flange region defined between said second and third pin regions so as to be interposed between said upper end portion of said link element and said second end portion of said substantially sector-shaped link element; and a base end region firmly attached to said seat cushion frame.

\* \* \* \* \*